United States Patent [19]
Geier

[11] Patent Number: 6,091,359
[45] Date of Patent: *Jul. 18, 2000

[54] PORTABLE DEAD RECKONING SYSTEM FOR EXTENDING GPS COVERAGE

[75] Inventor: George Jeffrey Geier, Scottsdale, Ariz.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/891,961

[22] Filed: Jul. 14, 1997

Related U.S. Application Data

[63] Continuation of application No. 08/891,961, Jul. 14, 1997.

[51] Int. Cl.[7] ............................... H04B 7/185; G01S 5/02
[52] U.S. Cl. ...................... 342/357.14; 701/217; 701/220
[58] Field of Search ............................... 342/357, 357.14; 701/217, 220

[56] References Cited

U.S. PATENT DOCUMENTS

| | | | |
|---|---|---|---|
| 5,075,693 | 12/1991 | McMillan et al. | 342/457 |
| 5,394,333 | 2/1995 | Kao . | |
| 5,416,712 | 5/1995 | Geier et al. . | |
| 5,525,998 | 6/1996 | Geier | 342/357 |
| 5,644,317 | 7/1997 | Weston et al. | 342/357 |
| 5,774,829 | 6/1998 | Cisneros et al. | 701/213 |
| 5,787,384 | 7/1998 | Johnson | 701/216 |

*Primary Examiner*—Theodore M. Blum
*Attorney, Agent, or Firm*—Bradley J. Botsch; John J. King

[57] ABSTRACT

This invention extends GPS coverage in an automotive environment without requiring direct interfaces to the vehicle's sensors in a unique and cost effective way. Since it removes all required vehicle interfaces (except power), it produces a virtually portable navigation system with no installation requirements beyond that of the GPS receiver itself. It also removes the necessary "customization" of the navigation system to each particular vehicle. Fundamentally, the position of a vehicle is obtained by GPS receiver data augmented with a low cost gyro whereby the gyro accurately tracks the heading changes of the vehicle (in the absence of sufficient GPS information), and the GPS receiver includes an innovative algorithm for deriving speed information from Doppler measurements from just one or two GPS satellites.

7 Claims, 3 Drawing Sheets

PORTABLE DEAD RECKONING SYSTEM FOR EXTENDING GPS COVERAGE

This application is a continuation of Ser. No. 08/891,961, filed Jul. 14, 1997.

BACKGROUND OF THE INVENTION

Use of global positioning satellite (GPS) receivers in automotive navigation, emergency messaging, and tracking systems is now widespread. However, systems based solely on GPS generally do not work well in dense city environments, where signal blockage and reflection by tall buildings, in addition to radio frequency interference, often occurs. A cost effective solution to this problem is to augment the GPS receiver with some form of Dead Reckoning (DR), to fill in the gaps occurring as a result of loss of GPS coverage and improve the accuracy of the GPS trajectory.

A DR system commonly takes the form of an interface to the transmission odometer of the vehicle to provide an indication of speed, in combination with a low cost gyro to track the vehicle's heading. This odometer interface makes the DR system installation unique to each vehicle type, and so is undesirable for many potential applications. Thus, a conventional DR system requires a "customization" to each alternative vehicle type.

Accordingly, the present invention extends GPS coverage in an automotive environment without requiring direct interfaces to the vehicle's sensors in a unique and very cost effective way. Since it removes all required vehicle interfaces except power, it produces a virtually portable navigation system with no installation requirements beyond that of the GPS receiver itself. It also removes the necessary "customization" of the navigation system to each particular vehicle. Fundamentally, the GPS receiver is augmented with a low cost gyro, which accurately tracks the heading changes of the vehicle (in the absence of GPS), and an innovative algorithm for deriving speed information from Doppler measurements from just one or two GPS satellites combined with the vehicle heading predicted from the low cost gyro.

DETAILED DESCRIPTION OF THE DRAWINGS

The Global Positioning Satellite (GPS) System may be used to determine the position of a movable vehicle, having a GPS receiver installed thereon, on or near the surface of the earth from signals received from a constellation of satellites. The orbits of the GPS satellites are arranged in multiple planes in order that signals can be received from at least four satellites at any position on earth. More typically, signals are received from six or eight satellites at most places on the earth's surface.

Orbits of GPS satellites are determined with accuracy from fixed ground stations and are relayed to the spacecraft. The latitude, longitude and altitude of any point close to the surface of the earth can be calculated from the times of propagation of the electromagnetic signals from four or more of the satellites. A measured range, referred to as a "pseudorange", is determined between the GPS receiver and the satellites based upon these propagation times. The measured range is referred to as pseudorange because there is typically a time offset between timing clocks on the satellites and a clock within the GPS receiver. To determine a three dimensional position, at least four satellite signals are needed to solve for the four unknowns represented by the time offset and the three dimensional position. If a prior altitude is available and can be assumed constant, three pseudo ranges can be used to compute a two dimensional fix (i.e., to update latitude and longitude at the fixed altitude).

The present invention addresses the problem of being able to accurately estimate the position of a movable vehicle when two or less GPS satellites are available for receiving data. To that end, the present invention utilizes a gyro to derive a heading change of the movable vehicle when two or less satellites are available. Further, the velocity of the vehicle is derived in a unique way by making use of the Doppler data from the satellites that are avaible. Also, the present invention is "portable" in at least the sense that the dead reckoning portion (i.e., the gyro) of the present invention does not require any custom wheel or transmission interfaces.

Figure 1:
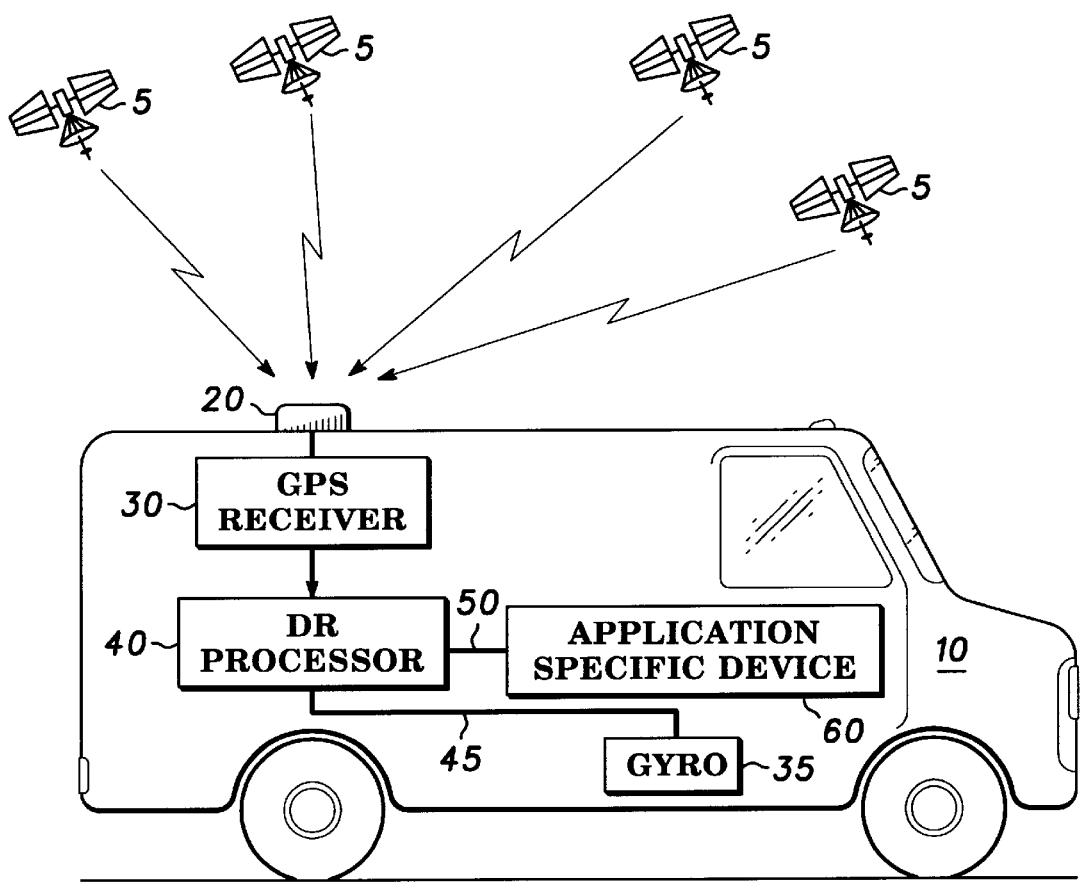
FIG. 1 is an illustration of a movable vehicle in which the portable dead reckoning system has been installed.

Referring to FIG. 1, a preferred embodiment of the present invention includes GPS receiver 30, with a GPS antenna 20 installed externally on the movable vehicle 10. The combination of GPS receiver 30 and antenna 20 is capable of tracking and deriving range and range rate measurements simultaneously to at least four GPS satellites 5. A DR processor 40, with a serial interface 45 to a low cost gyro 35, mechanizes the algorithms for integrating the GPS and gyro information. For minimum cost and ease of integration, the DR processor 40 algorithms can be implemented within the GPS receiver's microprocessor.

Since, in the absence of a GPS velocity update, the current invention will derive vehicle speed information from a minimum set of Doppler (range rate) measurements and gyro extrapolated heading, the serial message input to the DR processor 40 need only contain the heading changes sensed by the low cost gyro. Accordingly, the gyro heading information and the speed information from the available satellites (if any) may be combined to estimate a position of vehicle 10 even when a sufficient number of GPS satellites are not present to obtain a reliable position based solely on GPS data. The low cost gyro 35 and requisite electronics (e.g., an Analog-to-Digital (A/D) converter) may be mounted directly on the GPS board (to achieve lowest cost or interfaced externally (for maximum flexibility). The integrated GPS/Gyro position, along with whatever solution quality measures may be generated by the algorithm, are output via a serial interface 50 to an Application Specific Device 60. This device may include a digital map and associated map-matching software for in-vehicle navigation systems, or an interface to a communications device (e.g., radio/modem or cellular phone) for systems which support vehicle tracking and emergency messaging/roadside assistance applications.

Figure 2:
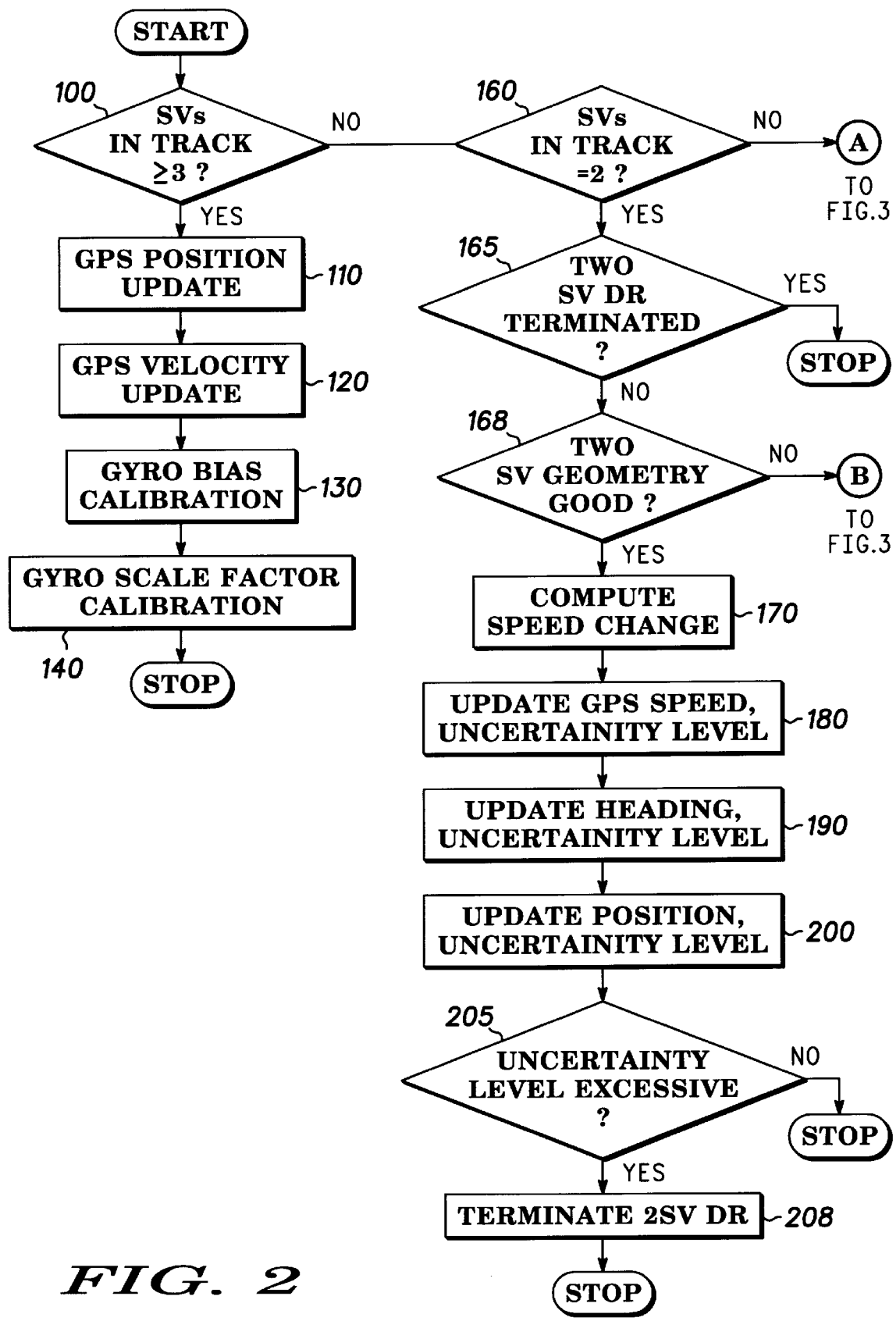
FIGS. 2 and 3 are flowcharts which illustrate the sequence of steps necessary to perform dead reckoning with the portable dead reckoning system, as a function of the number of satellites tracked by the GPS receiver.
Figure 3:
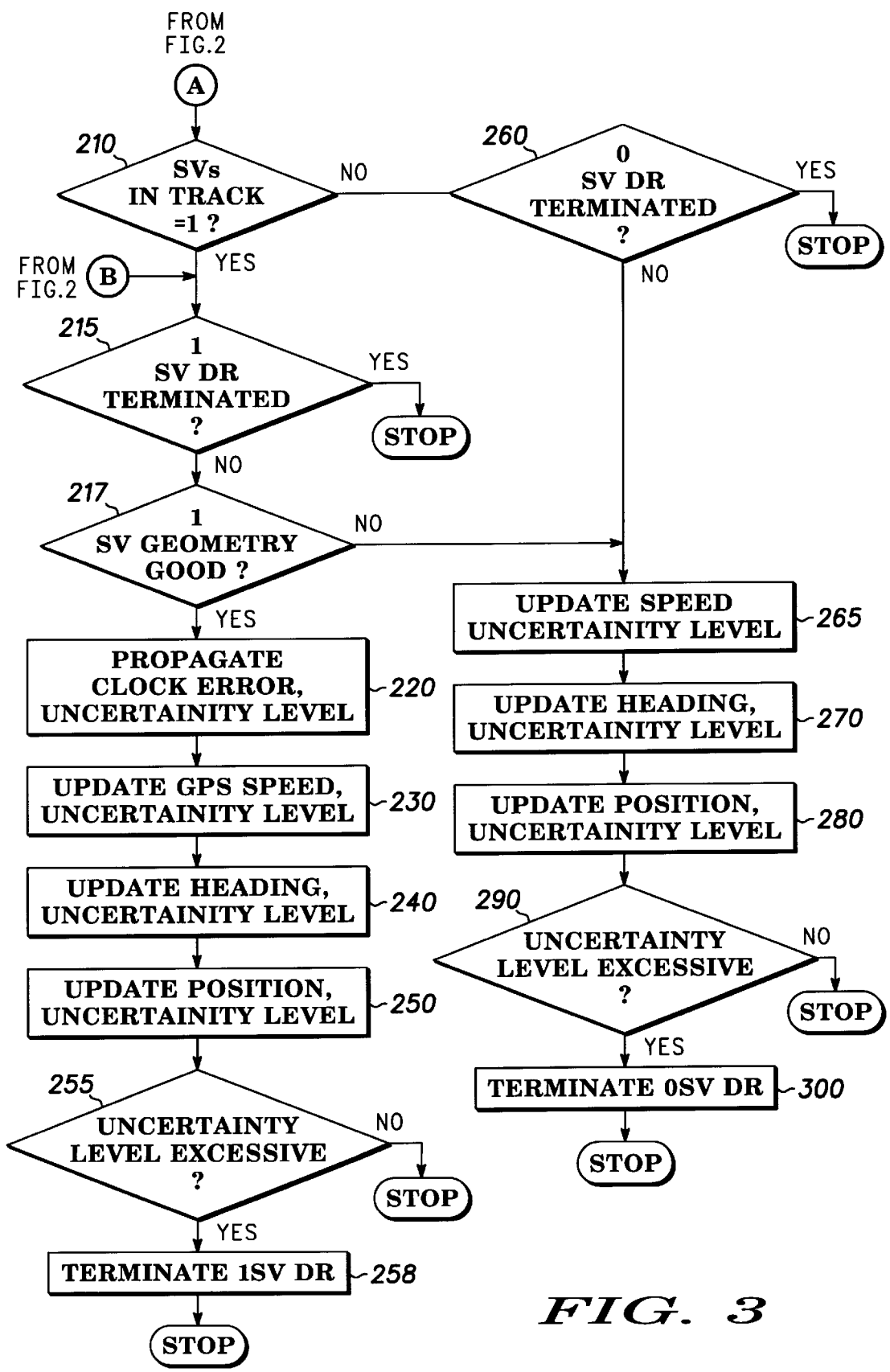

Referring now to both FIGS. 2 and 3, the sequence of processing steps which would be performed within the GPS receiver for implementing the present invention is described. The processing flow begins at control point A in FIG. 2, where the pseudo range and Doppler measurements have already been derived by the digital signal processing software within the GPS receiver. When a sufficient number of GPS satellites (i.e., a minimum of three) are tracked by the GPS receiver, as determined by test 100, the normal sequence of steps 110 and 120 are performed to derive position and velocity information from GPS. In step 110, the available pseudo range measurements derived by the GPS receiver are used in a least squares solution to update the vehicle's position as detailed in Kaplan, E., *Understanding GPS: Principles and Applications*, Artech House, 1996. Similarly, in step 120, the available Doppler measurements derived by the GPS receiver are used in a least squares solution to update the vehicle's velocity. Once the velocity components are updated in step 120, they can be converted using a conventional coordinate transformation to a speed and heading, which are preferrable coordinates for dead reckoning implementation.

Steps 110 and 120, which are typical steps performed within any GPS receiver. The present invention, however, further performs steps 130 and 140. In step 130, the zero-rate bias of the gyro is calibrated. At least one appropriate method for gyro bias calibration is detailed in pending patent application having U.S. Ser. No. 08/834,966, entitled "METHODS FOR GYRO BIAS ESTIMATION USING GPS", Attorney Docket number GE04014 and filed on Apr.7, 1997, the subject matter of which is incorporated by reference herein. Such a method does not require the existence of an interface to the vehicle's odometer, and so does not use the odometer to sense stationary periods of the vehicle. Step 130 is required generally for using a low cost gyro.

In step 140, which may be optional, heading changes sensed by the gyro are compared with GPS determined heading changes to adjust the nominal (i.e., factory supplied) value for the gyro scale factor. Following completion of the gyro scale factor calibration 140, processing can return to control point A in FIG. 2.

When only two satellites are tracked by the GPS receiver, as determined by test 160, GPS data is not sufficient to fully track the position of vehicle 10 and the present invention combines data from the two satellites and from gyro 35 to derive an estimate. First, a test 165 is performed to determine if the two satellite dead reckoning should be continued. This test is based upon the expected magnitude of the accumulated error while in the two satellite dead reckoning mode of the present invention. The expected accumulated error is propagated as a speed and heading error variance, and an east and north position error variance using Eqs. 3, 5, 7, and 9, respectively, given below. When the position error variances become excessive by exceeding a predetermined value, based on the magnitude of the maximum tolerable position error for the intended application of the positioning system, a flag is set (in step 208) to discontinue the two satellite dead reckoning. It is this flag which is tested in step 165.

For example, in an emergency messaging system, an accuracy level consistent with general GPS positioning accuracy is generally acceptable: roughly 100 meters for autonomous GPS positioning, and 10 meters for differential GPS. Thus, for autonomous GPS, an error accumulation which is small relative to 100 meters (e.g., 10 meters) is considered acceptable. For applications requiring differential GPS accuracies, however, tighter tolerances may need to be imposed. If the two satellite dead reckoning termination flag has been set in a previous cycle, the two satellite dead reckoning is bypassed, and control is returned to point A of FIG. 2. If the termination flag has not been set, the two satellite dead reckoning may continue (subject to the geometry test in step 168).

A geometry test is performed in 168: a satisfactory two satellite geometry leads to step 170, where a speed change is computed. A satisfactory geometry is one which enables speed change to be determined from Eqn. 1 below: if the denominator of Eqn. 1 (i.e., $\Delta v_{factor2}$) is close to zero, the geometry is near singular, and cannot support an accurate determination of speed change. Such a geometry would occur when the two satellites were both nearly directly overhead: for example, two satellites at elevations of 85 and 95 degrees, with a 90 degree azimuth separation, produce a value for $\Delta v_{factor2}$ which is marginally acceptable. Such two satellite geometries should not occur often, owing to the designed spatial diversity of the GPS satellite constellation. However, when such geometries occur, an alternate approach is taken to determine the speed changes of the vehicle according to the present invention, and control is transferred to point B in FIG. 2. Test 168 will effect this control transfer to the single satellite dead reckoning mode.

Given a satisfactory geometry, Eqn. 1 below can be used to compute the change in speed (the acceleration) of the vehicle, starting from the last determined GPS speed (computed from the last two or three dimensional velocity fix in 120).

$$\Delta v = [\delta \Delta D_{i0} + v \Delta H (\Delta H_{factor2})] / \Delta v_{factor2} \quad (1)$$

where:

$\delta \Delta D_{i0} = (Dopp^i - Dopp^j)_k - (Dopp^i - Dopp^j)_{k-1}$ $\Delta H_{factor2} = \cos E_i \sin dAz_i - \cos E_0 \sin dAz_0$;

$\Delta v_{factor2} = \cos E_i \cos dAz_i - \cos E_0 \cos dAz_0$;

k denotes time index;

Dopp denotes the Doppler measurement derived by the GPS receiver;

i, 0 denote satellite indices;

dAz=Az-H;

H denotes the current heading of the vehicle;

E denotes satellite elevation angle; AND

Az denotes satellite azimuth angle.

The $\Delta v$ determined using Eqn. 1 is added to the last determined speed as in Eqn. 2, and an estimate of the uncertainty introduced by the speed change computed from Eqn. 1 is derived using Eqn. 3, as represented by step 180. The speed uncertainty, $\sigma v^2$, is initialized to zero at the onset of the two satellite dead reckoning, and accumulates according to Eqn. 3 during the period of two satellite dead reckoning, until test 205 fails, which will terminate two satellite dead reckoning on the next cycle.

$$v_k = v_{k-1} + \Delta v \quad (2)$$

$$\sigma_v^2 = \sigma_v^2 + \sigma_{\Delta v}^2 \quad (3)$$

where:

$\sigma_{\Delta v}^2 = [\sigma_{ni}^2 + \sigma_{n0}^2 + \Delta H_{factor}^2 (v^2 \sigma_{gsf}^2 \Delta H^2 + \sigma_{vGPS}^2 \Delta H^2)] / \Delta v_{factor}^2$;

$\sigma_n^2$ denotes a Doppler measurement noise variance;

$\sigma_{gsf}^2$ denotes the error variance associated with the gyro scale factor; and $\sigma_{vGPS}^2$ denotes the error variance associated with the speed solution, computed in step 120.

GPS

Now that a speed change has been obtained, with an determined uncertainty factor, a heading change may be obtained. Referring to step 190, heading is updated by the low cost gyro as in Eqn. 4, and a heading uncertainty level is also computed, as expressed by Eqn. 5.

$$H_k = H_{k-1} + \Delta H_{gyro} \quad (4)$$

where:

$\Delta H_{gyro}$ is the heading change sensed by the low cost gyro.

$$\sigma_H^2 = \sigma_H^2 + \sigma_{\Delta H}^2 \quad (5)$$

where:

$\sigma_{\Delta H}^2 = \sigma_{gsf}^2 \Delta H^2 +_{qb}$; and $_{qb}$ denotes the variance associated with the random component of gyro drift.

The final step 200 of the two satellite dead reckoning process is to update the vehicle's horizontal position components (i.e., longitude and latitude) and their uncertainty levels using Eqns. 6–9:

$$\lambda_k = \lambda_{k-1} + \Delta p_e / R_e \cos L_k \quad (6)$$

where:

$\lambda$ = vehicle longitude;

$R_e$ = earth equatorial radius;

$L$ = vehicle latitude;

k denotes time index;

$\Delta p_e = v_{avg} \sin H_{avg}$;

$v_{avg} = (v_k + v_{k-1})/2$;

$H_{avg} = (H_k + H_{k-1})/2$.

$$\sigma_{\Delta pek}^2 = \sigma_{\Delta pek-1}^2 + \sigma_v^2 \cos^2 H_{avg} + v_{avg}^2 \sigma_H^2 \sin^2 H_{avg} \quad (7)$$

$$L_k = L_{k-1} + \Delta p_n / R_e \quad (8)$$

where:

k denotes time index; and $\Delta p_n = v_{avg} \cos H_{avg}$.

$$\sigma_{\Delta pnk}^2 = \sigma_{\Delta pnk-1}^2 + \sigma_v^2 \sin^2 H_{avg} + v_{avg}^2 \sigma_H^2 \cos^2 H_{avg} \quad (9)$$

Accordingly, from the above equations, a position estimate of vehicle 10 ($\lambda$, L) is obtained with only two satellites available.

The accuracy to which speed changes may be determined when two satellites are tracked is a function of the Doppler measurement noise on successive samples (the effects of Selective Availability (SA) on successive Doppler samples is negligible), and the two satellite geometry (as described by $\Delta v_{factor2}$). Assuming a typical "urban canyon" geometry (i.e., one of the two satellites directly overhead, and the second "along the street" at a specified elevation), Table 1 summarizes the resultant (one sigma) acceleration accuracies for a one sigma Doppler measurement error of 0.025 m/sec, corresponding to an average signal-to-noise ratio (e.g., 40 dB-Hz):

TABLE 1

Two Satellite Acceleration Accuracies

| SATELLITE ELEVATION | ACCELERATION ACCURACY |
| --- | --- |
| E = 10 degrees | 0.036 m/sec² |
| E = 30 degrees | 0.041 m/sec² |
| E = 50 degrees | 0.055 m/sec² |
| E = 70 degrees | 0.103 m/sec² |

Thus, the resultant accuracies are quite good, even up to a relatively high elevation angle (i.e., 70 degrees). Use of a speed updated using steps 170 and 180 at this worst geometry for ten seconds would result in a position error growth of roughly 5 meters, which is generally acceptable, relative to the nominal (i.e., non-differentially corrected) GPS error levels (i.e., 30 meters one sigma for autonomous operation with a good geometry). Upper and lower limiting of the calculated vehicle acceleration from Eqn. 1 is prudent, based on a priori knowledge of vehicle accelerations: vehicle acceleration or deceleration rarely approaches the 1 g level, and there is a minimum level associated with depressing the brakes or the accelerator pedal.

As previously mentioned, when less than two satellites are available as determined in test 210, or the two satellite geometry does not support an accurate determination of speed changes as determined in test 165, special measures are required to avoid positioning gaps. In step 215, a test is performed to determine if the single satellite dead reckoning mode should be continued. This test is based upon the expected magnitude of the accumulated error while in the single satellite dead reckoning mode of the present invention. The expected accumulated error is propagated as a speed and heading error variance, and an east and north position error variance using Eqs. 12, 5, 7, and 9, respectively. When the position error variances become excessive, based on the magnitude of the maximum tolerable position error for the intended application of the positioning system, a flag is set (in step 208) to discontinue the single satellite dead reckoning. It is this flag which is tested in step 215.

In step 217, a single satellite geometry test is performed: if the test fails, control is transferred to control point C in FIG. 2. The geometry test determines if the current single satellite geometry is satisfactory to support the single satellite dead reckoning mode of the present invention. A satisfactory geometry is one which enables speed change to be determined from Eqn. 11 below: if the denominator of Eqn. 11 (i.e., $\Delta v_{factor1}$) is close to zero, the geometry is near singular, and cannot support an accurate determination of speed change. Such a geometry would occur if the satellite was nearly directly overhead, or at an azimuth perpendicular to the current vehicle heading. For example, a satellite at an elevation of 85 degrees, produces a value for $\Delta v_{factor1}$ which is marginally acceptable. When an unsatisfactory geometry occurs, an alternate approach is required to determine the speed changes of the vehicle according to the present invention, and control is transferred to point C in FIG. 2. If the geometry test passes, the computations associated with the single satellite determination of speed change continue.

The first step is to perform a clock coast 220, where the error associated with the GPS receiver's oscillator is propagated ahead in time using the estimated frequency error of the GPS receiver's oscillator, as given by Eqn. 10 below:

$$\delta \phi_k = \delta \phi_{k-1} + \delta f_k \quad (10)$$

where:

$\delta \phi$ is the estimated clock phase (i.e., timing error associated with the GPS receiver's oscillator);

k denotes time index; and $\delta f$ is the estimated clock frequency error.

Given that the clock error has been updated using Eqn. 10, a single Doppler measurement can be used to determine the speed change of the movable vehicle, using Eqn. 11 below:

$$\Delta v = [\delta D_i + v \Delta H (\Delta H_{factor1})] / \Delta v_{factor1} \quad (11)$$

where:

$\delta D_{i0} = \text{Dopp}^i_{k} - \text{Dopp}^i_{k-1}$;

$\Delta H_{factor1} = \cos E_i \sin dAz_i;$ $\Delta v_{factor1} = \cos E_i \cos dAz_i;$ k denotes time index;

Dopp denotes the Doppler measurement derived by the GPS receiver;

i denotes the satellite index;

Az=Az-H;

H denotes the current heading of the vehicle;

E denotes satellite elevation angle; and

Az denotes satellite azimuth angle.

The accuracy to which speed changes can be determined when a single satellite is tracked is a function of the Doppler measurement noise on successive samples (the effects of Selective Availability (SA) on successive Doppler samples is negligible), and the satellite geometry (as described by $\Delta v_{factor1}$. Assuming a typical "urban canyon" geometry with the single satellite "along the street" at the specified elevation, Table 2 summarizes the resultant (one sigma) acceleration accuracies for a one sigma Doppler measurement error of 0.025 m/sec, corresponding to an average signal-to-noise ratio (e.g., 40 dB-Hz):

TABLE 2

Single Satellite Acceleration Accuracies

| SATELLITE ELEVATION | ACCELERATION ACCURACY |
|---|---|
| E = 10 degrees | 0.025 m/sec$^2$ |
| E = 30 degrees | 0.029 m/sec$^2$ |
| E = 50 degrees | 0.039 m/sec$^2$ |
| E = 70 degrees | 0.073 m/sec$^2$ |

Thus, the resultant accuracies are quite good, even up to a relatively high elevation angle (i.e., 70 degrees). Use of a speed updated using step 230 at this worst geometry for ten seconds would result in a position error growth of roughly 3.5 meters, which is generally acceptable, relative to the nominal (i.e., non-differentially corrected) GPS error levels (i.e., 30 meters one sigma for autonomous operation with a good geometry).

However, the error associated with the clock error update 220 must be considered. For typical low cost oscillators, this error source can be expected to dominate the error budget. In effect, it increases the effective Doppler measurement error by a factor of five to ten. Its effect must therefore be considered in predicting the error associated with the single satellite dead reckoning. Accordingly, step 230 includes updating the vehicle's speed and an associated uncertainty level, as previously given by Eqn. 3, but with Eqn. 12 used to compute $\sigma_{\Delta v}^2$.

$$\sigma_{\Delta v}^2 = [\sigma_{ni}^2 + \sigma_{\delta\phi}^2 + \Delta H_{factor}^2 (v^2 \sigma_{gsf}^2 \Delta H^2 + \sigma_{vGPS}^2 \Delta H^2)]/\Delta v_{factor}^2; \quad (12)$$

$\sigma_{\delta\phi}^2 = \sigma_{\delta\phi}^2 + \sigma_{\delta f}^2;$ $\sigma_n^2$ denotes a Doppler measurement noise variance;

$\sigma_{gsf}^2$ denotes the error variance associated with the gyro scale factor; and $\sigma_{vGPS}^2$ denotes the error variance associated with the speed solution, computed in step 120.

GPS

Following step 230, the vehicle's heading estimate, via gyro 35, and its error variance are updated in step 240, using Eqn. 5. Finally, the position components and their error variances are updated in step 250, as previously given by Eqns. 6, 7, 8, and 9.

Following update of the position components and their error variances, the error variances are tested against a threshold in test 255: if the threshold is exceeded, implying that the dead reckoning error has become excessive, the single satellite termination flag is set in step 258, and will not permit single satellite dead reckoning to continue on the subsequent cycle. Otherwise, single satellite dead reckoning may continue on subsequent cycles, and control is transferred to control point A in FIG. 2.

Accordingly, a position estimate of vehicle 10 is obtained with only one satellite available.

If no satellites are tracked by the GPS receiver or the single satellite geometry test has failed, test 260 is performed: if the zero satellite termination flag has been set on a previous cycle, control will be transferred to control point A in FIG. 2. The zero satellite dead reckoning flag will be set based upon the expected magnitude of the accumulated error while in the zero satellite dead reckoning mode of the present invention. The expected accumulated error is propagated as a speed and heading error variance, and an east and north position error variance using Eqs. 12, 5, 7, and 9, respectively. When the position error variances become excessive, based on the magnitude of the maximum tolerable position error for the intended application of the positioning system, a flag is set (in step 300) to discontinue the zero satellite dead reckoning. It is this flag which is tested in step 260. If the zero satellite termination flag has not been set, steps 265–300 will be performed.

In step 265, an uncertainty level associated with the dead reckoned speed is updated, as given by Eqn. 20. Since no satellites are in track, the speed of vehicle 10 must be estimated based upon an assumption of constant speed augmented by a maximum lateral acceleration constraint. The maximum lateral acceleration constraint is given by Eqn. 13 below:

$$v \Delta H < a_{latmax} \quad (13)$$

where:

$a_{laftax}$ is the expected maximuml lateral acceleration of the movable vehicle.

Typically, without special tires or banked roads, maximum lateral accelerations are less then 5 m/sec$^2$. Thus, significant heading changes can result in a decreased speed (according to Eqn. 13) in the zero satellite dead reckoning mode of the present invention. Without significant heading changes, however, no information can be derived about the acceleration of the vehicle, and so an uncertainty must be assigned each cycle that the zero satellite dead reckoning mode is exercised, as given bu Eqn. 14. Thus, the zero satellite dead reckoning mode should only be exercised for a limited time interval.

$$\sigma_v^2 = \sigma_v^2 + \sigma_a^2 \quad (14)$$

where:

$\sigma_a^2$ is the variance associated with vehicle acceleration. The heading and its error variance are updated in step 270, as given previously by Eqns.2,3,4,and 5.

Finally, in step 280, the position components and their error variances are updated, as given previously by Eqns. 6, 7, 8, and 9.

In test 290, the position error variances are compared with a threshold, and the dead reckoning termination flag is set in step 300 if the levels are excessive. Otherwiswe, control is transferred to control point A in FIG. 2. Accordingly, a position estimate of vehicle 10 is obtained even when no satellites are available.

While a preferred embodiment of the present invention is described, it is contemplated that various modifications may be made thereto without departing from the spirit and scope of the present invention. Accordingly, it is intended that the embodiments described be considered only as illustrative of the invention and that the scope of the invention be determined by the claims hereinafter provided.

What is claimed is:

1. A method for extending Global Positioning System (GPS) coverage of a movable vehicle in which a navigation system is installed, said navigation system comprised of a GPS receiver and a gyro, said method comprising the steps of:

determining whether a sufficient number of GPS satellites are tracked to obtain a reliable position of said movable vehicle based upon GPS data;

receiving heading information from said gyro;

determining vehicle acceleration information of said movable vehicle from at least one GPS satellite;

combining heading information from said gyro with said vehicle acceleration information;

using said combined heading and vehicle acceleration information to obtain a position estimate of said movable vehicle; and determining whether an uncertainty level of said position estimate has exceeded a predetermined value.

2. The method of claim 1 further including the steps of:

receiving GPS velocity data when data from said sufficient number of GPS satellites are available; and using said received GPS velocity data to calibrate said gyro.

3. The method of claim 1 further including the steps of:

estimating an error associated with said position estimate of said movable vehicle; and disregarding said position estimate when said error exceeds a predetermined value.

4. The method of claim 1 wherein said vehicle acceleration information is derived from two GPS Doppler measurements.

5. The method of claim 1 wherein said vehicle acceleration information is derived from a single GPS Doppler measurements augmented by a user clock error propagation.

6. The method of claim 1 wherein said vehicle acceleration information is determined through maximum acceleration constraints based upon said vehicle's maximum lateral acceleration.

7. The method of claim 1 wherein said vehicle acceleration information is assumed to be zero.

* * * * *